(12) United States Patent
Bright et al.

(10) Patent No.: US 8,546,988 B2
(45) Date of Patent: Oct. 1, 2013

(54) MAGNETIC GEAR ARRANGEMENT (75) Inventors: Christopher G. Bright, Nottingham (GB); Huw L. Edwards, Swansea (GB)

(73) Assignee: Rolls-Royce PLC, London (GB)

( * ) Notice: Subject to any disclaimer, the term of this patent is extended or adjusted under 35 U.S.C. 154(b) by 351 days.

(21) Appl. No.: 13/055,330

(22) PCT Filed: Jul. 2, 2009

(86) PCT No.: PCT/EP2009/004786
§ 371 (c)(1),
(2), (4) Date: Jan. 21, 2011

(87) PCT Pub. No.: WO2010/015300
PCT Pub. Date: Feb. 11, 2010

(65) Prior Publication Data
US 2011/0121674 A1    May 26, 2011

(30) Foreign Application Priority Data
Aug. 8, 2008   (GB) .................................. 0814400.8

(51) Int. Cl.
*H02K 49/10* (2006.01)
(52) U.S. Cl.
USPC ............................. 310/103; 310/105; 310/266
(58) Field of Classification Search
USPC ................. 310/103, 105, 106, 112–114, 266; 417/420, 423.7
See application file for complete search history.

(56) References Cited

U.S. PATENT DOCUMENTS

| | | | |
|---|---|---|---|
| 3,889,140 A | 6/1975 | Baermann | |
| 6,211,597 B1* | 4/2001 | Nakano | 310/266 |
| 6,217,298 B1* | 4/2001 | Klaui | 417/420 |
| 6,335,606 B1* | 1/2002 | Minagawa et al. | 318/801 |
| 6,440,055 B1 | 8/2002 | Meisberger | |
| 6,710,492 B2* | 3/2004 | Minagawa | 310/113 |
| 6,794,781 B2 | 9/2004 | Razzell et al. | |
| 8,063,526 B2* | 11/2011 | Bright | 310/103 |
| 2006/0226721 A1 | 10/2006 | Dooley et al. | |
| 2009/0309442 A1* | 12/2009 | Qu et al. | 310/114 |

FOREIGN PATENT DOCUMENTS

| | | |
|---|---|---|
| EP | 0 766 263 A2 | 4/1997 |
| EP | 1 353 436 A2 | 10/2003 |
| GB | 745911 | 3/1956 |
| GB | 1025605 | 4/1966 |
| GB | 2 287 585 A | 9/1995 |
| WO | WO 2007/107691 A1 | 9/2007 |
| WO | WO 2007/135360 A1 | 11/2007 |

OTHER PUBLICATIONS

International Search Report in International Application No. PCT/EP2009/004786; dated Jan. 29, 2010.

* cited by examiner

*Primary Examiner* — Tran Nguyen
(74) *Attorney, Agent, or Firm* — Oliff & Berridge, PLC (57) ABSTRACT

A magnetic gear arrangement having a first gear member for generating a first magnetic field and a second gear member for generating a second magnetic field. An interpole member is provided between the first and second gear members for coupling the two magnetic fields and controlling the gear ratio between the two gear members. The interpole member includes a unitary body of magnetizable material and associated control wiring, and is arranged such that when current is passed through the wiring, space regions of the unitary body are magnetized by an electrically-induced magnetic field. Discrete interpoles, the number and spacing of which define the gear ratio, are then formed in the unitary body between adjacent magnetized regions.

20 Claims, 6 Drawing Sheets

Fig.1

( Related Art )

MAGNETIC GEAR ARRANGEMENT

The present invention relates to magnetic gear arrangements, particularly magnetic gear arrangements having a variable gear ratio.

Gearboxes and gear arrangements are utilised in a wide range of situations in order to couple drive mechanisms. Traditionally, gearboxes have been formed from gear wheels having appropriate teeth numbers and sizes to provide a desired gear ratio. However, such gearboxes have a number of disadvantages. Firstly, they require the use of lubricating oils, which may act as contaminants or fire hazards and may prove ineffective in hot or cold environments, where the oil viscosity varies, or in a low pressure environment, where the oil may evaporate. Furthermore, gearboxes based on gear wheels may be noisy, making them unacceptable for low noise environments such as in hospitals, libraries and residential areas, or in clandestine military activities.

More recently, magnetic gearboxes have been provided which comprise respective gear rotors with interpoles between them. The rotors incorporate permanent magnets, and the interpoles, or pole members or elements, act to modulate the magnetic flux transferred between the gear rotors. Such magnetic gearboxes enable a speed-changing mechanical device to be provided in which there is no mechanical contact between input and output shafts, thus avoiding many of the problems of noise and wear that arise in gearboxes having contacting moving parts.

Figure 1:
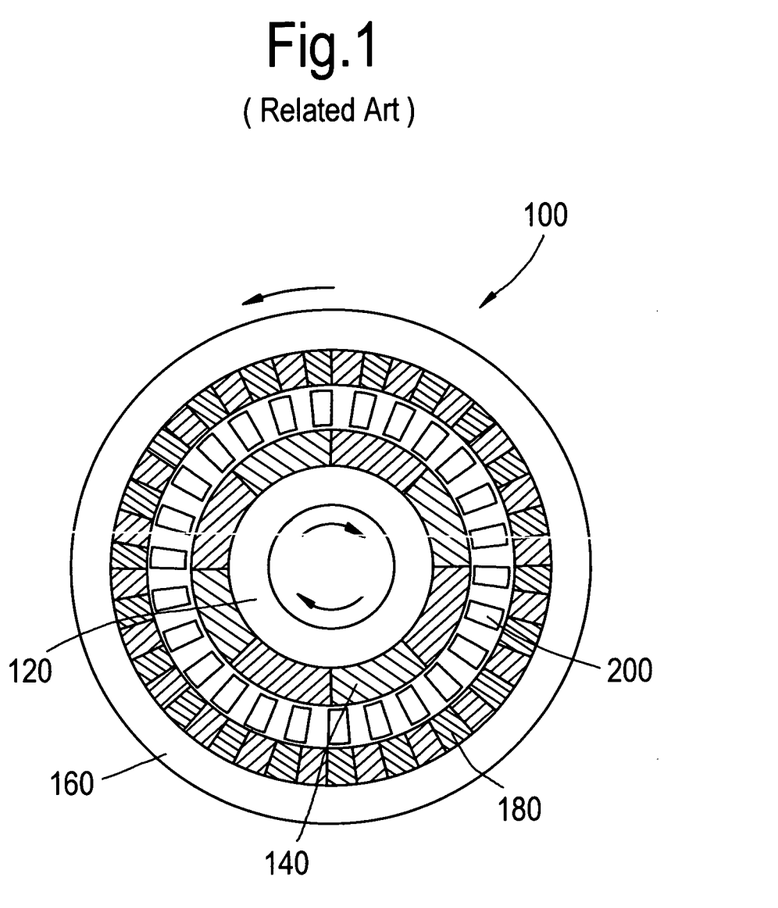
FIG. 1 shows a schematic plan view of a gearbox of the prior art.

FIG. 1 shows a schematic plan view of a typical magnetic gear arrangement of the prior art. The magnetic gear arrangement 100 is an epicyclic gearbox and comprises an inner rotor 120 and an outer rotor 160. Permanent magnets 140,180 are fixed to the inner and outer rotors 120,160. The permanent magnets 140 affixed to the inner rotor 120 have alternating polarity along the circumference of the rotor. Similarly, the permanent magnets 180 affixed to the outer rotor 160 have alternating polarity along the circumference of that rotor. Typically, one rotor is mechanically coupled to a drive mechanism and the other rotor is mechanically coupled to a driven mechanism.

The inner and outer rotors 120,160 have different numbers of permanent magnets 140,180. Typically, the number of permanent magnets affixed to the outer rotor 160 is greater than that affixed to the inner rotor 120.

Interpoles 200 are provided between the inner rotor 120 and the outer rotor 160 and form an array having a cylindrical shape.

The interpoles 200 modulate the magnetic field produced by the inner rotor 120 and the magnetic field produced by the outer rotor 160, so as to couple the two fields and hence the motion of the rotors. The number of interpoles is a factor in determining the gear ratio of the magnetic gearbox.

The motion of the rotors 120,160 may be either co-rotational or counter-rotational, depending on the number of magnets affixed to each rotor and the number of interpoles.

WO2007/107691 describes a magnetic gearbox arrangement in which coils of electrically-conductive wire are wound around the interpoles. By selectively short-circuiting these coils, the magnetic flux around particular interpoles may be reduced significantly, thus diminishing the modulation capacity of the selected interpoles and effectively removing them from service. Thus, it is possible to change the number and arrangement of active interpoles in the gearbox, in order to modify the gear ratio as required.

Alternatively, a DC current may be passed through the coils around selected interpoles in order to magnetically saturate those interpoles and effectively remove them from service. Again, by changing the number of active interpoles, the gear ratio of the gearbox maybe adjusted to suit the requirements of the application.

However, the arrangement described in WO2007/107691 has a disadvantage that the windings around the interpoles are bulky. Additionally, short-circuiting the coils induces high currents in the coils and thus results in significant power losses. Similarly, the DC current that is required to produce magnetic saturation of the interpoles is high.

In general terms, the present invention provides a magnetic gear arrangement in which the interpoles are provided by a unitary body of magnetisable material. Discrete regions of the unitary body may be activated or deactivated as dictated by the requirements of the application, to provide varying numbers of active interpoles and hence a variable gear ratio.

An aspect of the present invention may provide a magnetic gear arrangement comprising:

a first gear member for generating a first magnetic field and a second gear member for generating a second magnetic field, an interpole member being provided between the first gear member and the second gear member for coupling the first magnetic field and the second magnetic field, and controlling a gear ratio between the first gear member and the second gear member, wherein the interpole member comprises a unitary body of magnetisable material and associated control wiring, and is arranged such that when current is passed through the wiring, spaced regions of the unitary body are magnetised by an electrically-induced magnetic field, and discrete interpoles, the number and spacing of which define the gear ratio, are formed in the unitary body between adjacent magnetised regions.

Typically, the first and second gear members of the gear arrangement are gear rotors. These gear rotors may be configured in an epicyclic arrangement or may be arranged so that they are co-axial, and displaced from each other along their central axis. In this case, the interpole member is typically cylindrical.

Gear arrangements are also possible in which the central axes of the gear rotors are offset, as described in WO2007/135360. In this case, the interpole member is shaped to extend between the two gear rotors.

By arranging the interpole member so that a plurality of discrete interpoles may be provided on a unitary body of magnetisable material, the number of interpoles may be varied easily and a wide range of interpole configurations may be achieved. By using magnetised regions of the interpole member to separate adjacent interpoles, these interpoles may be positioned with a high degree of flexibility.

The magnetised regions of the interpole member result from an electrically-induced magnetic field. Typically, the magnetised regions are magnetically saturated by this field. Alternatively, these regions may be magnetised to different extents in order to provide differing modulation effects along the unitary body of the interpole member.

Typically, the electrically-induced magnetic field is provided by wiring extending through the interpole member, e.g. through vias in the interpole member.

When current is passed along a portion of the wiring, the material immediately adjacent to that portion becomes magnetised. The wiring may be arranged to form conducting circuits, and each conducting circuit may be activated singly by means of a switch. Alternatively, the conducting circuits may be connected to form windings, so that when current is passed along a winding, a plurality of magnetised regions are produced. The conducting circuits may be connected in different ways to produce different configurations of magnetised regions.

In the case of a cylindrical interpole member, the conducting wires typically extend in an axial direction of the interpole member.

Typically, the magnetisable material of the interpole member is a magnetically soft material, i.e. it exhibits low hysteresis losses. The coercivity of the magnetisable material is typically less than 60 Amperes per meter, preferably less than 30 Amperes per meter. The magnetisable material may be electrical steel. In general, this material is laminated in order to reduce loss through eddy currents. Typically, a cylindrical interpole member will be radially laminated.

The magnetic field generated by the first and second gear members of the gear arrangement is typically provided by permanent magnets disposed on these members. Alternatively, the magnetic field may be generated by electrical windings provided on these members.

Although the first and second gear members of the gear arrangement are typically gear rotors, alternative configurations are possible. For example, the magnetic gear arrangement may provide a linear magnetic actuator. In this case, the first and second gear members are generally elongate in shape and are aligned relative to each other, an elongate interpole member being disposed between them.

In another configuration, the magnetic gear arrangement may provide a tubular magnetic gear. In this case, the first gear member may have an elongate form and the second gear member may have a cylindrical form. The first and second gear members may be disposed such that their longitudinal axes coincide. A cylindrical interpole member may be disposed between the first and second gear members. The tubular gear arrangement may be configured such that the first and second gear members move relative to each other in the longitudinal direction.

Typically, the position and orientation of the interpole member are fixed within the gear arrangement during use. However, configurations of the gear arrangement are possible in which the position and orientation of either the first or second gear member are fixed within the gear arrangement during use, and the interpole member moves within the gear arrangement. In this case, it is preferable that the conducting wires are activated by a slip switching mechanism. The slip switching mechanism typically comprises at least one slip ring or commutator, and, optionally, a brush.

Embodiments of the invention will now be described by way of example with reference to the accompanying drawings in which.

Figure 2:
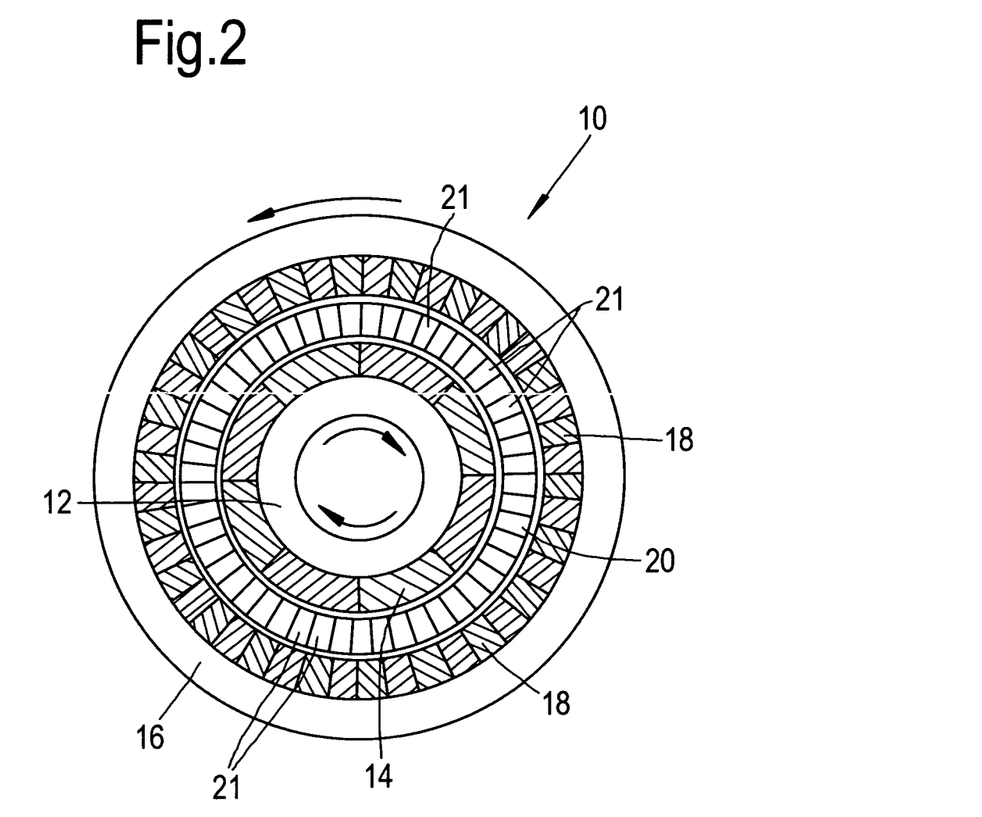
FIG. 2 shows a schematic plan view of a gearbox of a first embodiment of the invention.

FIG. 2 shows a schematic plan view of a magnetic gear arrangement according to the present invention. As is the case for the magnetic gearbox 100 of the prior art, shown in FIG. 1, the gearbox 10 of the present invention is an epicyclic gearbox having an inner rotor 12 and an outer rotor 16. Permanent magnets 14,18 are fixed to the inner and outer rotors 12,16. Typically, one rotor is mechanically coupled to a drive mechanism and the other rotor is mechanically coupled to a driven mechanism.

An interpole member 20 extends between the inner and outer rotors 12,16. The interpole member 20 comprises a unitary body 21 having a cylindrical shape. The cylinder has a central axis that coincides with the central axes of the inner and outer rotors 12,16. Typically, the cylindrical unitary body 21 is made of electrical steel, which may be laminated. In general, the steel is laminated in a radial direction throughout the unitary body.

The function of the interpole member 20 is to modulate the magnetic field provided by the inner rotor 12 and the magnetic field produced by the outer rotor 16, so as to couple the two fields and hence the motion of the rotors.

Figure 3A:
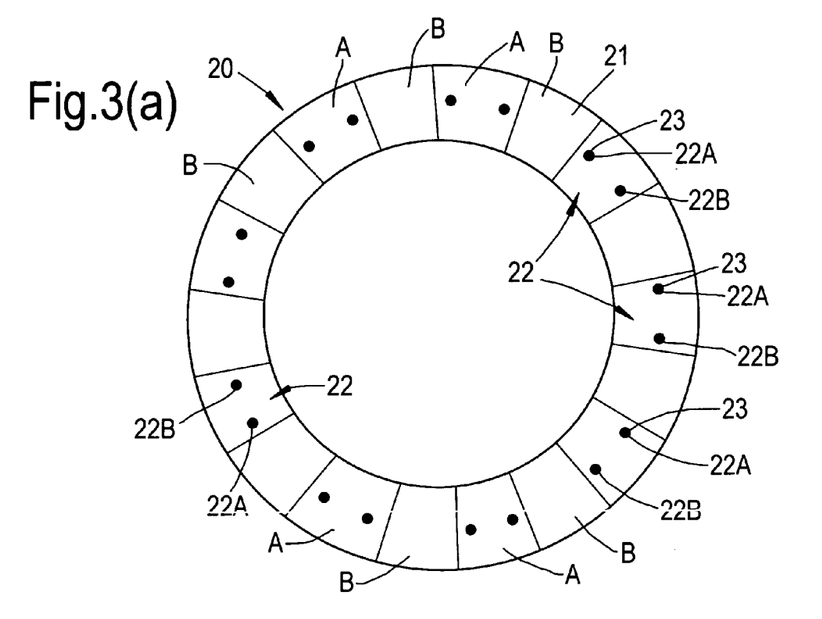
FIG. 3(a) shows a schematic plan view of the interpole member of the gearbox of FIG. 2.
Figure 3B:
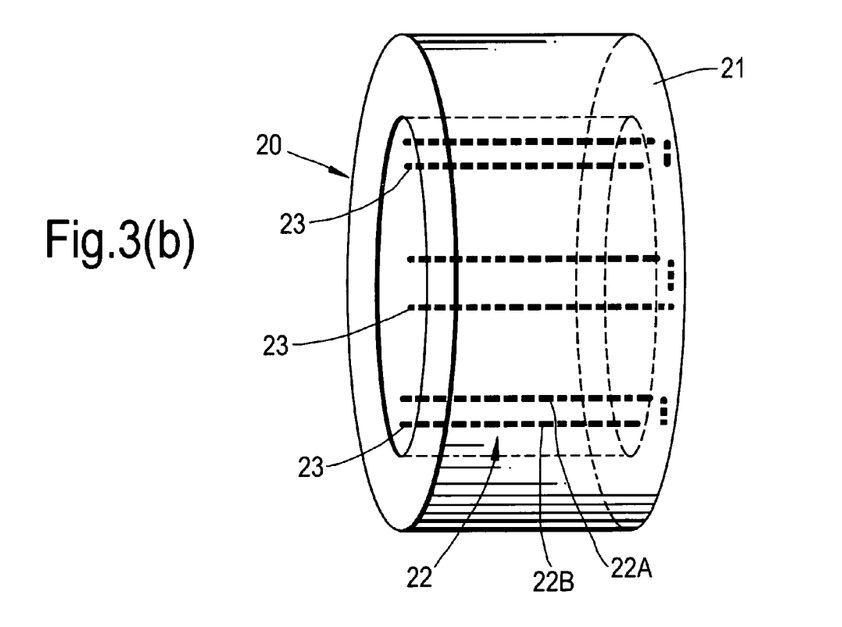
FIG. 3(b) shows a perspective view of the interpole member of the gearbox of FIG. 2.

FIG. 3 shows the interpole member 20 of FIG. 2 in more detail. FIG. 3(a) shows a plan view of the interpole member 20, while FIG. 3(b) shows a perspective view. Wiring extends through the cylindrical unitary body of the interpole member 20, along vias formed in the body, to provide individual conducting circuits 22. The wiring is electrically insulated from the cylindrical unitary body 21 and is arranged so that each conducting circuit 22 comprises a single wire 23 that follows an outward path 22A parallel to the central axis of the cylinder and a return path 22B that is parallel but displaced from the outward path 22A. The outward and return paths 22A, 22B may be spaced circumferentially (as in FIG. 3(a)) or radially.

In the embodiment shown in FIG. 3, the conducting circuits 22 are equally spaced around the cylindrical unitary body 21. However, equal spacing is not essential. The conducting circuits 22 are arranged so that a voltage may be placed separately across each one of them, thus allowing an electrical current to flow along the outward and return path 22A, 22B defined by the conducting wire 23 of each conducting circuit.

The electrical current passing through each conducting circuit 22 produces a magnetic field around the wiring 23. If the current is sufficiently large, the magnetisation of the region A around the wiring 23 will be strong enough for that region A to become effectively impermeable to flux. This region A will therefore form a barrier to the magnetic flux passing between the inner and outer rotors 12,16. Typically, the magnetised regions A will become magnetically saturated.

The regions B of the interpole member 20 that are remote from the conducting wires 23 remain permeable to magnetic flux. These regions B are circumferentially spaced around the cylindrical unitary body 21 and their boundaries are provided by the magnetised regions A. Effectively, each region B of the cylinder that remains permeable to magnetic flux corresponds to an interpole 200 of the prior art gearbox shown in FIG. 1.

The interpole member may alternatively be configured such that individual conducting circuits 22 are connected to each other in series or in parallel to form different sets of interpole windings. Each interpole winding results in a different arrangement of magnetically saturated and magnetically permeable regions along the circumference of the interpole member.

Although in this embodiment, the interpole member 20 remains stationary relative to the gearbox as a whole, alternative configurations are possible in which the interpole member 20 is allowed to rotate and either the inner rotor 12 or the outer rotor 16 remains stationary. This configuration could be achieved by providing an appropriate slip switching mechanism for the conducting circuits 22.

The magnetic gear arrangement of the present invention may be realised in a number of different configurations.

Figure 4A:
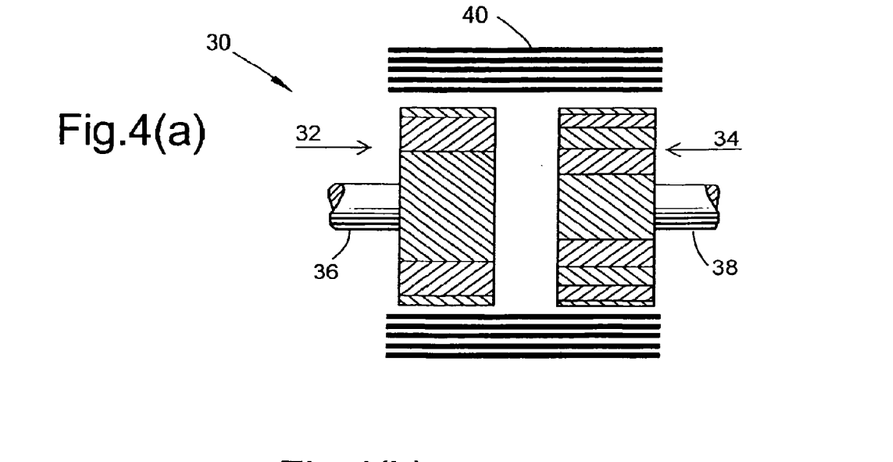
FIG. 4(a) shows a schematic section view of a gearbox of a second embodiment of the invention.
Figure 4B:
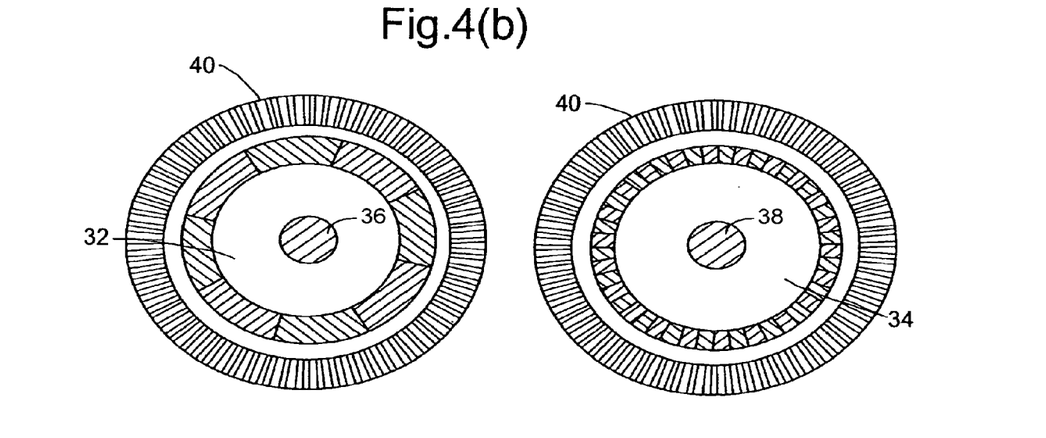
FIG. 4(b) shows schematic front and rear views of the gearbox shown in FIG. 4(a), along a longitudinal axis of that gearbox.

FIG. 4 shows a magnetic gear arrangement of a second embodiment of the invention. FIG. 4(a) shows a side view of the second embodiment, while FIG. 4(b) shows two views taken from the front and rear of the gearbox. This gearbox 30 has a first rotor 32 and a second rotor 34. As is the case for the epicyclic gearbox of the first embodiment of the invention, the first and second rotors 32, 34 have an array of permanent magnets affixed to their circumference, the second rotor 34 having more magnets around its circumference than the first rotor 32. The polarity of the magnets alternates around the circumference of the rotors. The first and second rotors 32, 34 have the same diameter and are positioned coaxially. Typically, one rotor 32 is mechanically coupled to a drive mechanism 36, and the other rotor 34 is mechanically coupled to a driven mechanism 38.

The first and second rotors 32,34 are located within the interpole member 40, which comprises a hollow cylindrical unitary body coaxial with the rotors. Again, the cylindrical unitary body of the interpole member 40 has conducting circuits embedded within it, which may be used to magnetise or magnetically saturate regions of the cylinder, thus dividing the interpole member into discrete interpoles that modulate the magnetic field from the permanent magnets on the first and second rotors 32,34.

In an alternative configuration, the first and second rotors 32,34 may be located outside the cylindrical interpole member, each at a respective end of the interpole member.

Figure 5:
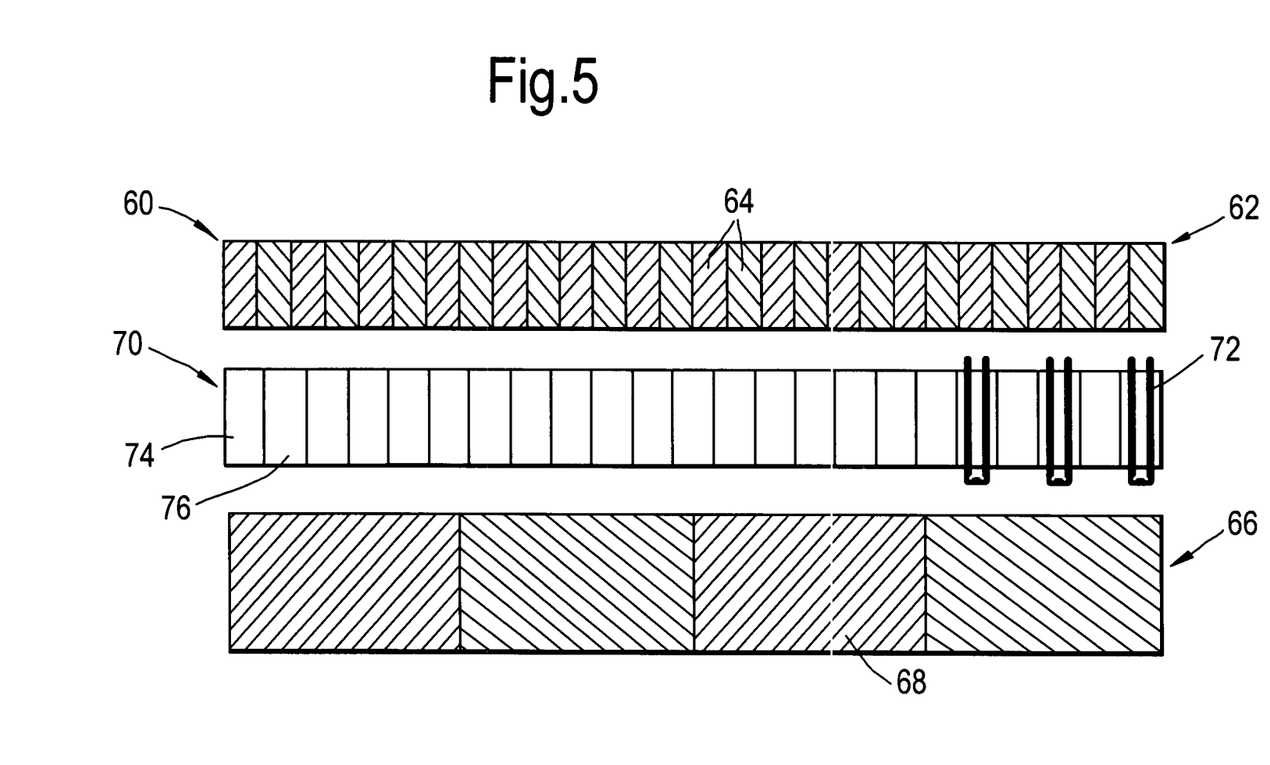
FIG. 5 shows a schematic plan view of a gearbox of a third embodiment of the invention.

FIG. 5 shows a magnetic gear arrangement of a third embodiment of the invention. This gear arrangement has a linear magnetic actuator 60 having a low speed member 62 and a high speed member 66. The low speed member 62 and the high speed member 66 each have magnetic poles 64,68 of alternating polarity. The number of magnetic poles on the low speed member 62 is greater than the number on the high speed member 66.

Between the low speed member 62 and the high speed member 66 is an interpole member 70. The interpole member comprises a unitary body that is made of electrical steel and that may be laminated to reduce electrical losses. The unitary body of the interpole member 70 carries a number of conducting circuits 72 that can be activated either individually or in sets to produce alternating magnetised and unmagnetised regions 74,76. The unmagnetised regions 76 act as virtual interpoles to modulate the magnetic field provided by the permanent magnets affixed to the low and high speed members 62,66.

Figure 6:
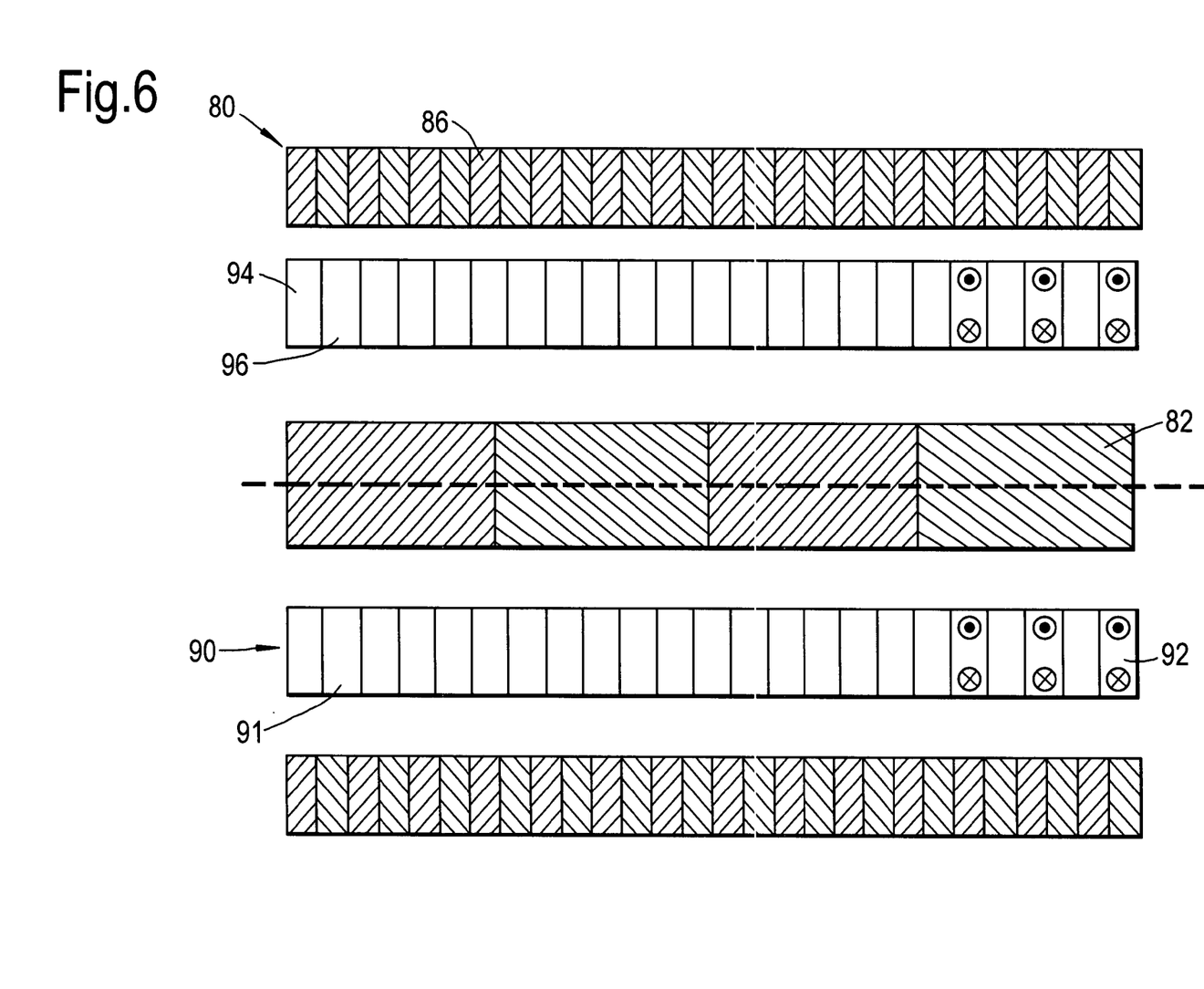
FIG. 6 shows a schematic section view of a gearbox of a fourth embodiment of the invention.

FIG. 6 shows a magnetic gearbox of a fourth embodiment of the invention. This gearbox has a tubular magnetic gear 80 having a high speed member 82 that is held within the cylindrical low speed member 86 and extends along its central axis. The high speed and low speed members 82,86 each have permanent magnets of alternating polarity distributed along their length, the number of magnets affixed to the low speed member 86 being greater than that affixed to the high speed member 82.

An interpole member 90 comprising a cylindrical unitary body 91 is interposed between the high speed member 82 and the low speed member 86. A plurality of conducting circuits 92 are distributed along the length of the unitary body 91. A voltage may be placed separately across each of these conducting circuits 92 in order to magnetise regions of the unitary body 91. The magnetised regions 94 separate unmagnetised regions 96 from each other so that these unmagnetised regions are able to act as discrete interpoles to modulate the magnetic fields provided by the permanent magnets affixed to the high and low speed members 82,86.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A magnetic gear arrangement comprising a first gear member for generating a first magnetic field and a second gear member for generating a second magnetic field,
   an interpole member being provided between said first gear member and said second gear member for coupling said first magnetic field and said second magnetic field, and controlling a gear ratio between said first gear member and said second gear member,
   wherein said interpole member comprises a unitary body of magnetisable material and associated control wiring, and is arranged such that when current is passed through the control wiring, spaced regions of the unitary body are magnetised by an electrically-induced magnetic field to form a number of discrete interpoles, a spacing of the interpoles defines the gear ratio, and the control wiring comprises a plurality of conducting circuits distributed along a length of the unitary body.

2. A magnetic gear arrangement according to claim 1, wherein said magnetised regions are magnetically saturated by the current.

3. A magnetic gear arrangement according to claim 1, wherein said wiring extends through said interpole member.

4. A magnetic gear arrangement according to claim 1, wherein said interpole member is cylindrical.

5. A magnetic gear arrangement according to claim 4, wherein said wiring extends through said interpole member in an axial direction of said interpole member.

6. A magnetic gear arrangement according to claim 1, wherein said first gear member has permanent magnets for generating said first magnetic field, said second gear member has permanent magnets for generating said second magnetic field.

7. A magnetic gear arrangement according to claim 1, wherein the position and orientation of said interpole member is fixed.

8. A magnetic gear arrangement according to claim 1, wherein said first gear member and said second gear member have respective mechanical couplings.

9. A magnetic gear arrangement according to claim 8, wherein the couplings are to connect a drive mechanism and a driven mechanism.

10. A magnetic gear arrangement according to claim 1, wherein the first and second gear members are gear rotors.

11. A magnetic gear arrangement according to claim 4, wherein said conducting circuits are spaced around the cylindrical unitary body.

12. A magnetic gear arrangement according to claim 1, wherein each conducting circuit comprises a single wire that has an outward path and a return path, and the return path is parallel to the outward path.

13. A magnetic gear arrangement according to claim 4, wherein each conducting circuit comprises a single wire that has an outward path and a return path, and the return path is parallel to the outward path.

14. A magnetic gear arrangement according to claim 13, wherein the outward and return paths are spaced circumferentially or radially.

15. A magnetic gear arrangement according to claim 1, wherein the conducting circuits are connected in series or in parallel.

16. A magnetic gear arrangement according to claim 1, wherein each conducting circuit has a switch to selectively provide a voltage across the associated conducting circuit to allow an electrical current to flow through the conducting circuit to magnetise one of the spaced regions of the unitary body.

17. A magnetic gear arrangement according to claim 1, wherein a number of conducting circuits connected in series have a switch to selectively provide a voltage across the conducting circuits to allow an electrical current to flow through the conducting circuits to magnetise a number of the spaced regions of the unitary body.

18. A magnetic gear arrangement according to claim 1, wherein a number of conducting circuits connected in parallel have a switch to selectively provide a voltage across each conducting circuit to allow an electrical current to flow through the conducting circuits to magnetise a number of the spaced regions of the unitary body.

19. A magnetic gear arrangement comprising:
a first gear member for generating a first magnetic field;
a second gear member for generating a second magnetic field; and
an interpole member being provided between said first gear member and said second gear member for coupling said first magnetic field and said second magnetic field, and controlling a gear ratio between said first gear member and said second gear member,
wherein said interpole member comprises a unitary body of magnetisable material and associated control wiring, the control wiring comprises a plurality of conducting circuits distributed along a length of the unitary body and at least one switch to selectively provide a voltage across at least one associated conducting circuit to allow an electrical current to pass through the associated conducting circuit, spaced regions of the unitary body are magnetised by an electrically-induced magnetic field to form a number of discrete interpoles in the unitary body between adjacent magnetized regions and the number of interpoles and a spacing of the interpoles defines the gear ratio.

20. A magnetic gear arrangement comprising:
a first gear member for generating a first magnetic field;
a second gear member for generating a second magnetic field; and
an interpole member being provided between said first gear member and said second gear member for coupling said first magnetic field and said second magnetic field, and controlling a gear ratio between said first gear member and said second gear member,
wherein said interpole member comprises a unitary body of magnetisable material and associated control wiring, the control wiring extending through said interpole member, the control wiring comprises a plurality of conducting circuits distributed along a length of the unitary body, at least one switch to selectively provide a voltage across at least one associated conducting circuit to allow an electrical current to pass through the associated conducting circuit, spaced regions of the unitary body are magnetised by an electrically-induced magnetic field to form a number of discrete interpoles in the unitary body between adjacent magnetized regions and the number of interpoles and a spacing of the interpoles defines the gear ratio.

* * * * *